US006956474B2

(12) United States Patent
Jakubowski (10) Patent No.: US 6,956,474 B2
(45) Date of Patent: Oct. 18, 2005

(54) HAND PORTABLE MONITORING DEVICE FOR MONITORING PERSONNEL PRESENCE AT A LOCATION

(75) Inventor: Peter Jakubowski, Huntington Beach, CA (US)

(73) Assignee: Amano Cincinnati, Inc., Roseland, NJ (US)

( * ) Notice: Subject to any disclaimer, the term of this patent is extended or adjusted under 35 U.S.C. 154(b) by 588 days.

(21) Appl. No.: 10/093,772

(22) Filed: Mar. 8, 2002

(65) Prior Publication Data

US 2004/0203561 A1 Oct. 14, 2004

(51) Int. Cl.$^7$ ................................................ G08B 1/08
(52) U.S. Cl. ........................ 340/539.1; 340/539.11; 340/539.13
(58) Field of Search ................... 340/825.49, 686.1, 340/687, 539.1, 539.11–539.25, 573.1, 5.21, 340/5.3

(56) References Cited

U.S. PATENT DOCUMENTS

| 4,275,385 A | * | 6/1981 | White | 340/825.49 |
| 5,218,344 A | * | 6/1993 | Ricketts | 340/573.4 |
| 5,635,907 A | * | 6/1997 | Bernard et al. | 340/573.4 |
| 6,307,475 B1 | * | 10/2001 | Kelley | 340/573.1 |
| 6,417,760 B1 | * | 7/2002 | Mabuchi et al. | 340/5.3 |
| 6,614,350 B1 | * | 9/2003 | Lunsford et al. | 340/572.1 |
| 2004/0066276 A1 | * | 4/2004 | Gile et al. | 340/5.53 |

FOREIGN PATENT DOCUMENTS

| JP | 8-297156 | * | 11/1996 | F01S 1/68 |
| JP | P2000-90166 A | * | 3/2000 | G06F 17/60 |

* cited by examiner

Primary Examiner—Jeffery Hofsass
Assistant Examiner—Jennifer Stone
(74) Attorney, Agent, or Firm—Stetina Brunda Garred & Brucker (57) ABSTRACT

This invention describes a method and a system that is used to provide a list of personnel who were present in a building or area that has been evacuated due to an emergency, such as a fire or earthquake. The monitor stores data from a time clock or access control system in parallel with a separate server. The monitor is portable and can be taken out of the building. The monitor can be connected to central alarm monitoring company, who can act as a backup system with the ability to provide the data to a responding fire department. The portable unit can display the names, communicate the data to other display devices including printers.

18 Claims, 6 Drawing Sheets

HAND PORTABLE MONITORING DEVICE FOR MONITORING PERSONNEL PRESENCE AT A LOCATION

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to safety devices, and more particularly to a hand portable monitoring device for monitoring personnel presence at a location.

As the number of employees increases for a business, it becomes more difficult to remember or keep track of which employees have come to work, or who has left the building on business or illness. Confusion as to which employees were present in a building at the time of a disaster is one of the foremost obstacles to the work of emergency personnel, and presents several distinct problems. Lack of awareness that everyone is out of the building may result in unnecessary searching by the emergency personnel of dangerous areas. Not only is this undesirable because it wastes time and effort sorely needed elsewhere, but it furthermore exposes the emergency personnel to unnecessary dangers. The work of emergency personnel is dangerous, and searching for victims in a building which is burning or structurally unstable can result in the injury or even death of emergency personnel. Where there are no victims to be helped by the search, this risk is unacceptable.

Conversely, in some cases emergency personnel may mistakenly believe that a person is safe who is actually trapped in the building. This can happen, for instance, if the disaster occurs on a day on which the person in question normally does not work, but the person has come to work overtime. In cases such as these, emergency personnel may fail to aid a person in need as a simple result of being unaware that the person is present. Loss of life may flow as an unnecessary consequence, merely because of poor information.

The aforementioned problems have been of substantial concern to the emergency rescue community for some time and continue to grow in significance. Buildings in modern cities continue to reach new scales of grandeur and are now the workplaces of thousands of employees. The potential chaos that can result from disaster striking a building of such size is apparent.

The seriousness of poor information increases with the size of buildings for several reasons. First, the task of manually tracking the presence of personnel becomes more difficult when the number of people involved increases. Second, the potential danger to emergency rescue operations may increase proportionally. Third, the likelihood of disaster in a larger building may be higher because, for instance, there are more people in potential danger. The aforementioned factors are particularly alarming in the light of increased terrorist activity against the civilian population of the United States. The Oklahoma City Bombing and the destruction of the World Trade Center in particular demonstrate that terrorists may specifically target the very buildings that pose the most serious threat. Accordingly, it is of the utmost importance that systems be devised which make personnel presence readily available to emergency personnel.

Some companies use manual punch timecard systems to keep track of employee presence. Other companies have made or are making the transition from manual timecard systems to a computerized time clock system comprising a data collection device and a data processing device. The data collection device collects personnel presence data, for instance through the use of wallet-sized electronic identification devices, and sends the data to the data processing device for storage and processing.

Unfortunately, in such systems the personnel presence data is only available by workstation access to the data processing device. Moreover, in an emergency, the data is often inaccessible because the power is out and the data processing device is disabled. Even if the power isn't out, it will likely be impracticable to take the time necessary to extract the data from the data processing device. Therefore, a need exists to devise a system for quickly and conveniently providing accurate information as to which employees were present at a location at the time of a disaster.

BRIEF SUMMARY OF THE INVENTION

In accordance with the present invention there is provided a hand portable monitoring device for monitoring personnel presence at a location. The hand portable monitoring device has an internal power supply, rendering it capable of independent operation. The device collects personnel presence data from the building's personnel data system and stores it in either volatile or non-volatile memory. The device can be conveniently removed from the building by hand, without the use of any tools or special knowledge, and functions to generate a list of personnel in the building who need to be accounted for. The employees can be listed by name, employee ID number, vendor number, area of work, or emergency meeting area group. The list can be modified as needed. A display is provided on the hand portable monitoring device for easy viewing.

The hand portable monitoring device can also have a connector for communicating with an external device, such as a printer. This will allow separate lists to be made for different emergency meeting areas. Another embodiment includes an RF or infrared transmitter. In this way, the personnel presence data can be transmitted to other display devices, including personal data assistants. The transmitter could also use Bluetooth technology. Bluetooth technology is a newly emerging standard in wireless communication which makes communication between various devices easy.

The hand portable monitoring device can be engaged to the personnel data system in a variety of ways. The particular interface methodology is largely dependent upon the available data access points of a given system. For instance, some personnel data systems read a code from a card retained by the employee and translate the code into the employee's name before sending it to the data processing device. Others send the code to the data processing device for translation. In the first instance, the hand portable monitoring device of the present invention could simply intercept the data traveling to the data processing device. In the second instance, however, the monitor terminal must either receive data from the data processing device or have an internal chart of codes and names. The present invention may therefore be configured to receive data from either or both of the two devices.

The device of the present invention can include a quick release mechanism operative to allow fast and convenient removal of the device without any tools or special knowledge. The quick release mechanism can also function to send a signal to a the data processing device or another device. The receiving device can activate an alarm, such as a fire alarm, in response.

In another embodiment of the present invention, the data processing device can send data onto the Internet to a central station as a backup link. The data so transmitted can include a list of personnel to be accounted for, so that the emergency personnel can quickly check for all of the listed personnel.

The hand portable monitoring device can also contain a sender circuit, so that it can provide data back to the computer about personnel who did not register as they left the area. This data can be sent at a time when all personnel should have left the area, as when the shift ends.

DETAILED DESCRIPTION OF THE INVENTION

Figure 1:
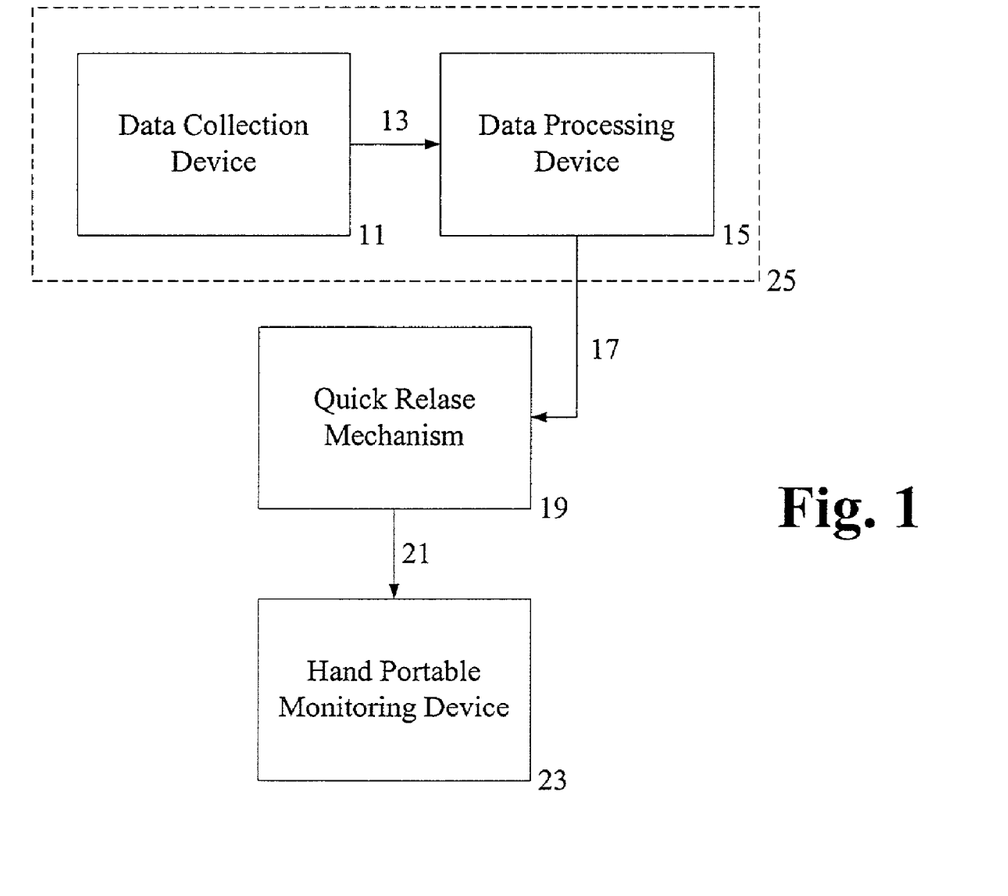
FIG. 1 is a block diagram for a personnel data system with a hand portable monitoring device in accordance with the present invention.

FIG. 1 is a block diagram for a personnel data system 25 with a hand portable monitoring device 23 in accordance with the present invention. A data collection device 11 is used to collect data with respect to employee presence at the location. The data collection device 11 is typically a computerized time clock, and is used by personnel to indicate that they are present or are leaving the building. Various methodologies may be employed by the data collection device 11. For instance, personnel may enter an employee number by means of a keypad, or pass a personal identification card through a slot in the data collection device 11. The personnel's information is read by the data collection device 11 and sent through a communication path 13 to a data processing device 15. The data processing device 15 is typically a computer, and is operative to process and store the information received from the data collection device 11. The processed personnel data is also sent via communication path 17 to a hand portable monitoring device 23, by way of a quick release mechanism 19 and a communication 21. The hand portable monitoring device 23 stores the information for later retrieval, and is described in greater detail below.

The examples propounded below extrapolate from the above implementation. However, it is understood that the basic system may be altered to suit the nature of the data collection system 25 in place. For instance, some data collection systems 25 utilize a data collection device 11 which reads employee numbers. The employee numbers are sent to the data processing device 15 for translation into employee names. In such a system, the hand portable monitoring device 23 must either receive personnel presence data from the data processing device 15 (as in the above example) or have an internal chart of names and numbers. Other personnel data systems 25 employ a data collection device 11 which reads employee names directly. With such a system, it would be possible to connect the quick release mechanism 19 directly to the data collection device 11 instead of via the data processing device 15. This might be desirable, for instance, because it would allow the hand portable monitoring device 23 to function despite a failure in the data processing device 15. A further addition would add bidirectional communication between the data collection device 15 and the hand portable monitoring device 23, so that the hand portable monitoring device 23 could send personnel presence data to the data processing device 15 once the failure was resolved. It is understood that a variety of such embodiments reflecting various connection methodologies are encompassed within the scope of the present invention, and it may be assumed that any device in the system may be connected to any other device in the system by means of either unidirectional or bidirectional control.

Figure 2:
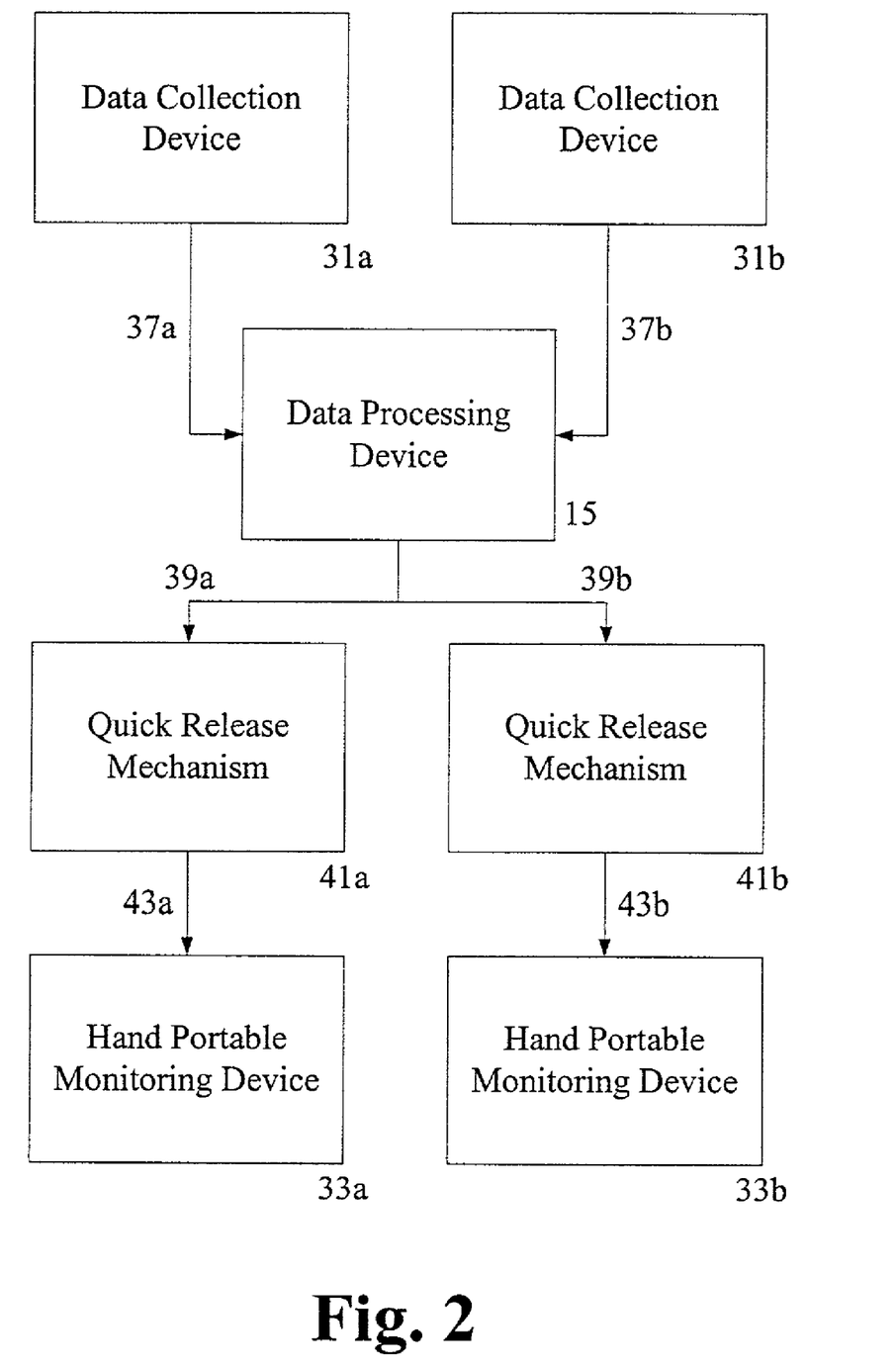
FIG. 2 is a block diagram for a personnel data system employing two data collection devices, to which two hand portable monitoring devices have been added.

FIG. 2 is a block diagram for a personnel data system employing two data collection devices 31a,b, to which two hand portable monitoring devices 33a,b have been added. Each data collecting device 31a,b sends-data to the data processing device 15 via its respective communication path 37a,b. The data is processed by the data processing device 15 and sent to the hand portable monitoring devices 33a,b via their respective communication paths 39a,b by way of the quick release mechanisms 41a,b and the communication paths 43a,b between the quick release mechanisms 41a,b and the associated hand portable monitoring devices 33a,b. By these means multiple data collection devices and/or hand portable monitoring devices 33a,b can be utilized. It is understood that the same implementation may be iterated to encompass any number of data collection devices 31a,b and/or hand portable monitoring devices 33a,b.

Figure 3:
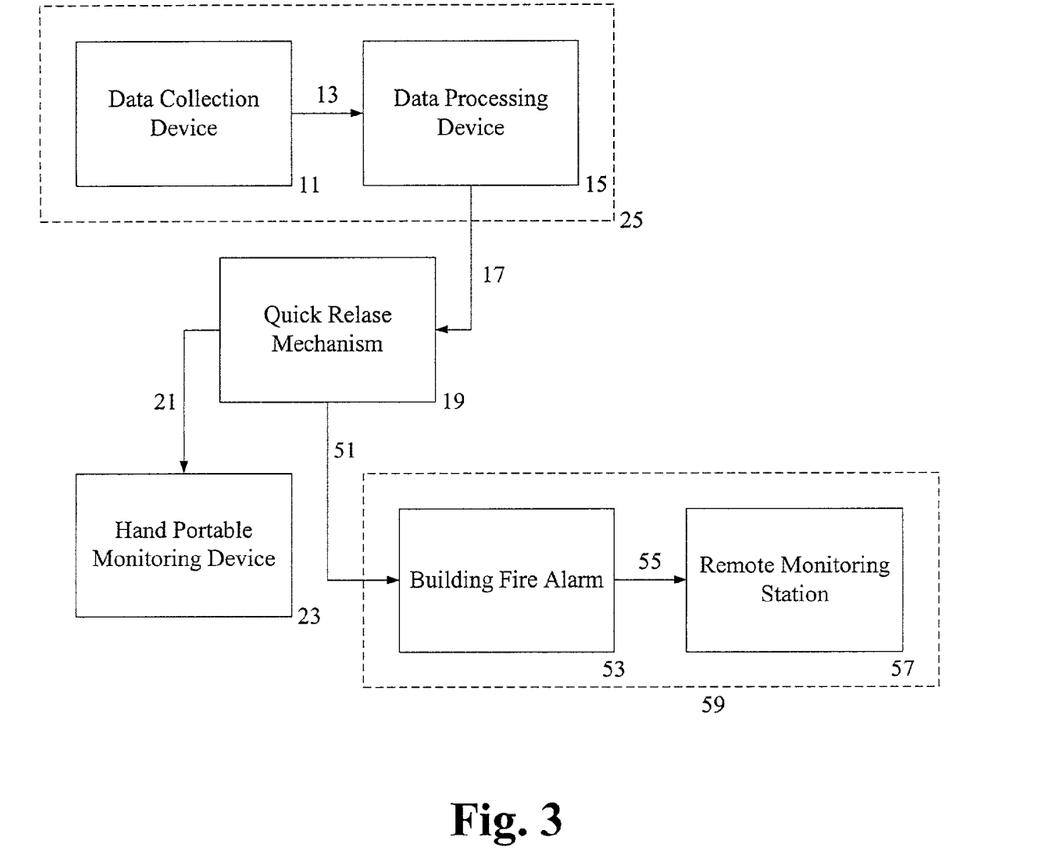
FIG. 3 is a block diagram demonstrating how the above described system may further operate in conjunction with an alarm system.

FIG. 3 is a block diagram demonstrating how the above described system may further operate in conjunction with an alarm system 59. Activation of the quick release mechanism 19 not only accomplishes disengagement of the hand portable monitoring device 23 but further sends a signal via a communication path 51 to a building fire alarm 53. This effects the activation of the building fire alarm 53. The building fire alarm 53 may itself be monitored by a remote monitoring station 57. The remote monitoring station could be, for instance, a local fire department. By this means disengagement of the hand portable monitoring device 23, generates an indication to persons inside the building that an emergency situation exists, and indication to the fire department that an emergency situation exists are all accomplished by a simple hand movement. Of course, it may be desirable to disengage the hand portable monitor 23 without activating any alarms, and a means for preventing the transmission of a signal which would do so may be included.

Figure 4:
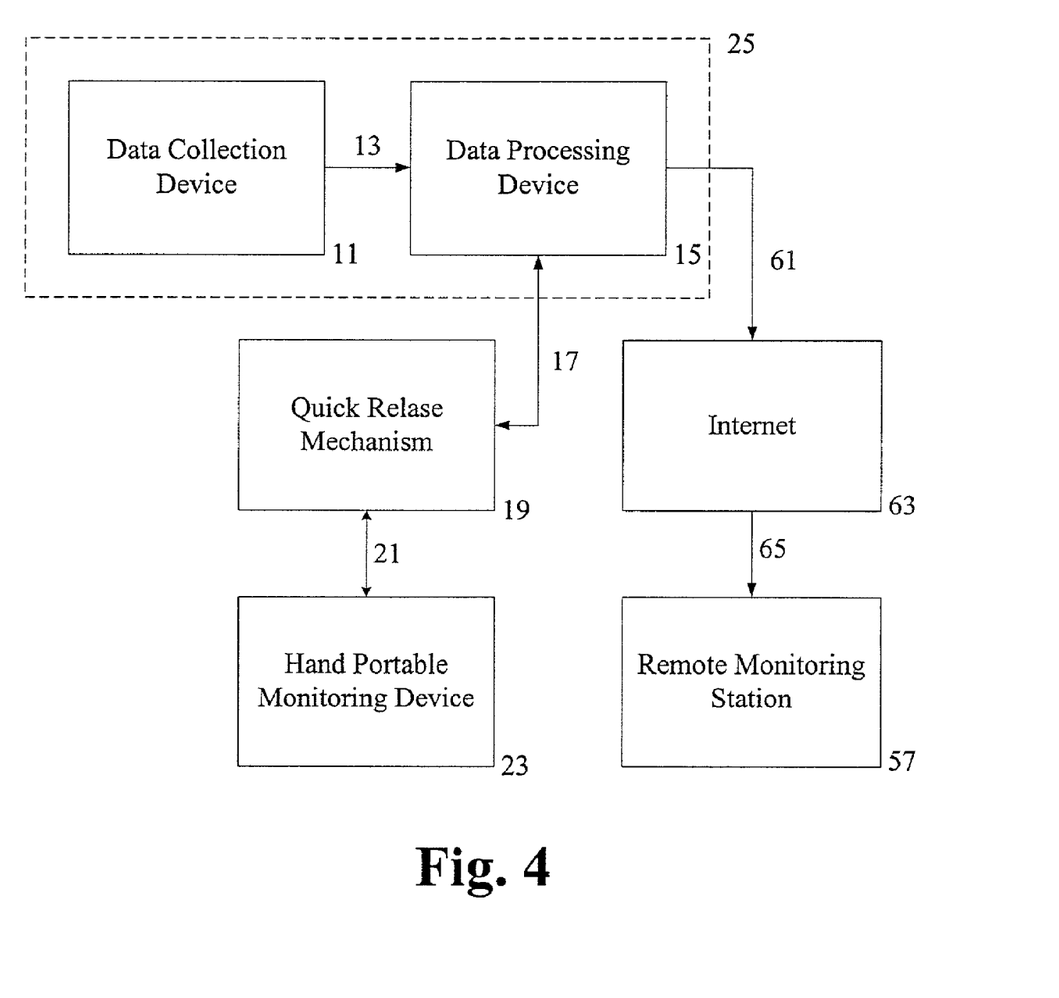
FIG. 4 illustrates an alternative arrangement wherein a remote monitoring station is not only alerted to the existence of an emergency situation, but provided with personnel presence data.

FIG. 4 illustrates an alternative arrangement wherein a remote monitoring station 57 is not only alerted to the existence of an emergency situation, but provided with personnel presence data. Operation of the quick release mechanism 19 causes the data to be sent by one of a variety of possible means. In one embodiment the hand portable monitoring device 23 sends its data via communication path 21, the quick release mechanism 19, communication path 17, to data processing device 15. The data is communicated to the remote monitoring station 57. The data process device 15 could also communicate its own internal records to the remote monitoring station 57. Of course, the data need not travel via the internet and could alternatively travel by phone line or RF signal, for instance. As will be recognized by one skilled in the art, the data need not travel from the hand portable monitoring device 23 through the data processing device 15, which might be inoperable during a power outage. Accordingly, by any of various series of connections, the remote monitoring station 57 is provided with an accurate list of personnel who need to be accounted for.

Figure 5:
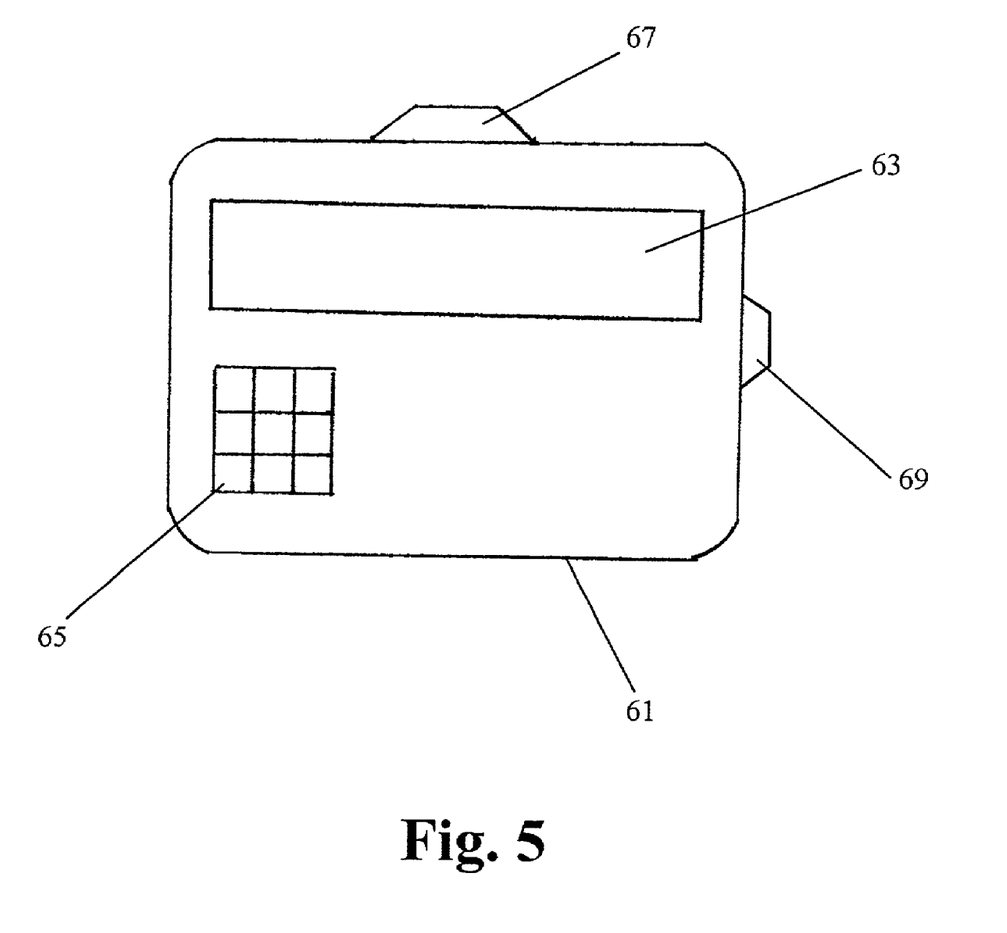
FIG. 5 illustrates a sample hand portable monitoring device.

FIG. 5 illustrates a sample hand portable monitoring device. The elements of the hand portable monitoring device are disposed within a casing 61, preferably of sturdy construction. Preferably casing has an internal power supply (not shown) which is operative to power the various elements, thereby rendering the hand portable monitoring device independently operable. The device may comprise a monitor 63, operative to display the personnel presence data stored by the memory (not shown). In the preferred embodiment of the present invention, the memory is non-volatile memory, which may take the form of a detachable memory card. The device may further comprise a keypad 65 which would allow a user to interface with the device in a more flexible fashion. For instance, the keypad 65 could be used to scroll through the list at will, or to delete names of persons who have been accounted for. The device comprises a connector 67 operative to put the device in electrical communication with a personnel data system. It may further comprise an additional connector 69 operative to transmit information to an external device, for instance a printer or personal data assistant (PDA). The connector 69 could be of a variety of formats, and could alternatively be (or connect to) a transmitter, such as an infrared or RF transmitter for the purposes of wireless communication. The transmitter could also use Bluetooth technology.

Figure 6:
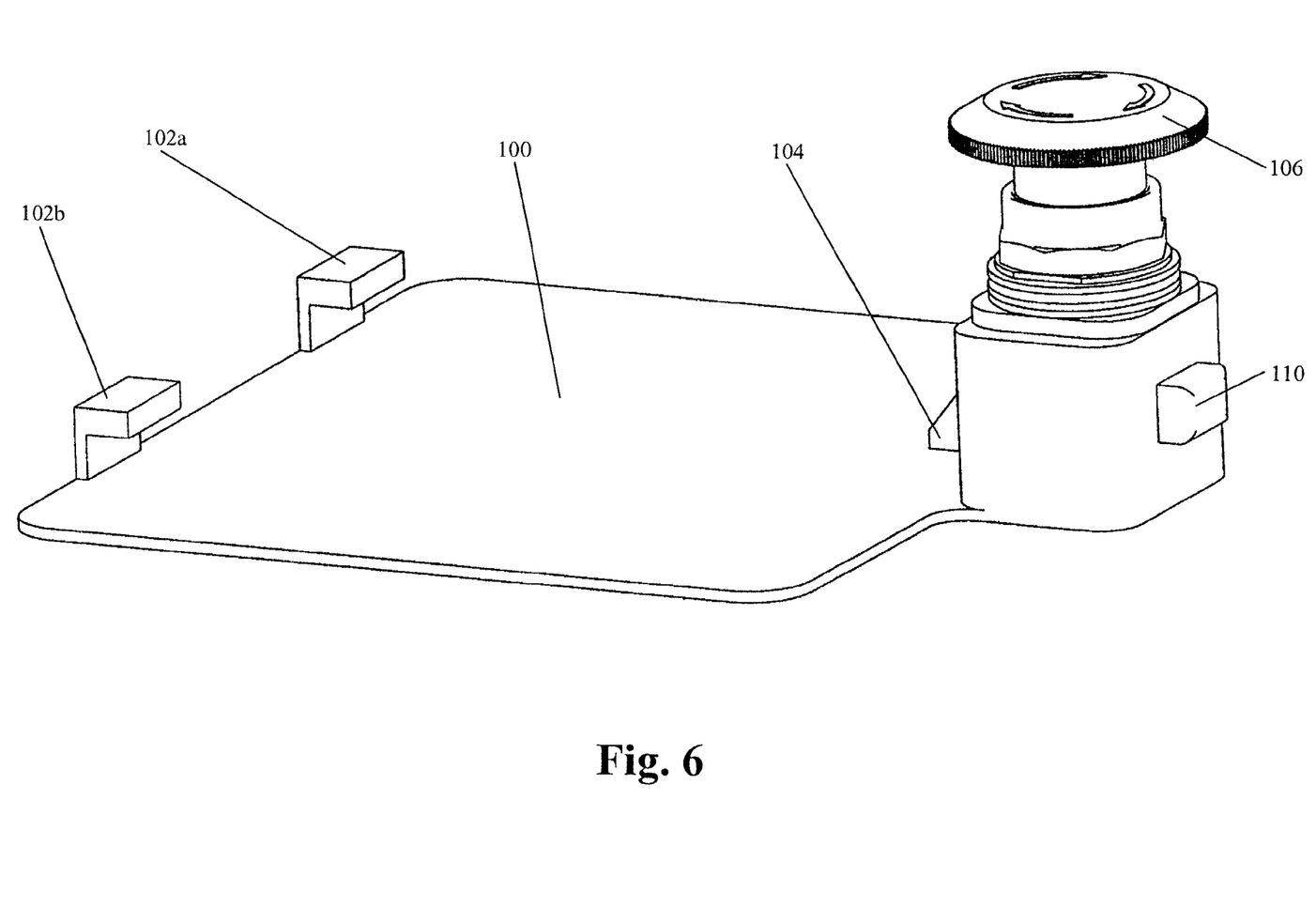
FIG. 6 illustrates a sample wall mount with a quick release mechanism.

FIG. 6 illustrates a sample wall mount with a quick release mechanism. The wall mount comprises a backing 100. The back side of the backing 100 may be fixed to a surface, for instance a building's exterior wall, by various means (such as adhesives or bolts). Two brackets 102a,b are disposed at the bottom of the backing 100 for holding the bottom of the hand portable monitoring device in place. A moveable latch 104 is disposed at the top of the backing or holding the top of the hand portable monitoring device in place and for communicating signals to and from the monitoring device. The moveable latch may be operable by means of a rotating knob 106. A connector 110 puts the monitoring device and quick release mechanism in electrical communication with the additional elements, as descried above. Rotation of the knob 106 may also trigger the transmission of a signal via the connector 110 to activate an alarm or send information, as discussed above.

Still further embodiments of the invention will be apparent to those of ordinary skill in the art.

What is claimed is:

1. A hand portable monitoring device for monitoring personnel presence at a location, the hand portable monitoring device comprising:
   a. a hand portable casing removably engageable to a mount;
   b. a communications port disposed on the casing and in electrical communication with a personnel data system when the casing is engaged to the mount, operative to receive personnel presence data-from the personnel data system;
   c. a processor and memory internal to the casing and in electrical communication with the communications port, operative to serve as a backup by storing the personnel presence data received from the personnel data system;
   d. a display disposed on the casing, operative to display the personnel presence data;
   e. a communications path operative to transmit a signal to a remote monitoring station; and
   f. a power source internal to the casing, operative to enable functioning of the hand portable monitoring device in the absence of an external power source.

2. The hand portable monitoring device of claim 1, further comprising an output connector disposed on the casing, operative to communicate the personnel presence data to a connectable external device.

3. The hand portable monitoring device of claim 1, further comprising a RF transmitter disposed on the casing, operative to transmit the personnel presence data to an external device.

4. The hand portable monitoring device of claim 3, wherein the radio transmitter uses Bluetooth technology.

5. The hand portable monitoring device of claim 1, further comprising an infrared transmitter disposed on the casing, operative to transmit the personnel presence data to an external device.

6. A hand portable monitoring device for monitoring personnel presence at a location, the hand portable monitoring device comprising:
   a. a casing removably engageable to a mount;
   b. a communications port disposed on the casing and in electrical communication with a personnel data system when the casing is engaged to the mount, operative to receive personnel presence data from the personnel data system;
   c. a processor and memory internal to the casing and in electrical communication with the communications port, operative to process and store the personnel presence data received from the personnel data system;
   d. a display disposed on the casing, operative to display the personnel presence data;
   e. a power source internal to the casing, operative to enable functioning of the hand portable monitoring device in the absence of an external power source; and
   f. a quick release mechanism, operative to activate a fire alarm when the hand portable monitoring device is removed from the mount.

7. The hand portable monitoring device of claim 1, wherein the personnel presence data displayed by the display includes the time and attendance information.

8. The hand portable monitoring device of claim 1, further comprising a sender circuit, operative to communicate data to the personnel presence data system with respect to which employees have left without clocking out.

9. The hand portable monitoring device of claim 1, wherein the memory is non-volatile memory.

10. A personnel presence monitoring backup system, the personnel presence monitoring backup system comprising:
   a. a data collection device operative to collect data in response to personnel check in and check out activities at a location;
   b. a data processing device in electrical communication with the data collection device, the data processing device being operative to process and store the collected data; and
   c. a hand portable monitoring device in detachable electrical communication with the data processing device, operative as a backup by receiving and storing personnel presence data received from the data processing device.

11. The personnel presence monitoring backup system of claim 10, wherein the hand portable monitoring backup device is disposed on an exterior building surface when engaged so as to be in electrical communication with the data processing device.

12. The personnel presence monitoring backup system of claim 10, wherein the data collection device is a computerized time clock, operative to indicate that personnel are present or have left the building.

13. A hand portable monitoring device for monitoring-personnel presence at a location, the hand portable monitoring device comprising:
   a. a hand portable casing removably engageable to a mount;
   b. a communications port disposed on the casing and in electrical communication with a personnel data system when the casing is engaged to the mount, operative to receive personnel presence data-from the personnel data system;
   c. a processor and memory internal to the casing and in electrical communication with the communications port, operative to serve as a backup by storing the personnel presence data received from the personnel data system;
   d. a display disposed on the casing, operative to display the personnel presence data;
   e. a power source internal to the casing, operative to enable functioning of the hand portable monitoring device in the absence of an external power source; and
   f. a communication path, wherein a remote monitoring station is provided with current personnel presence data when the hand portable monitoring and fire alarm device is disengaged from its mount.

14. The hand portable monitoring device of claim 1, wherein the personnel data system receives personnel presence data from a computerized time clock, operative to indicate that personnel are present or have left the building.

15. A hand portable monitoring device for monitoring-personnel presence at a location, the hand portable monitoring device comprising:
   a. a hand portable casing removably engageable to a mount;
   b. a communications port disposed on the casing and in electrical communication with a personnel data system when the casing is engaged to the mount, operative to receive personnel presence data-from the personnel data system;
   c. a processor and memory internal to the casing and in electrical communication with the communications port, operative to serve as a backup by storing the personnel presence data received from the personnel data system;
   d. a display disposed on the casing, operative to display the personnel presence data;
   e. a power source internal to the casing, operative to enable functioning of the hand portable monitoring device in the absence of an external power source; and
   f. a telephone transmitter disposed on the casing, operative to transmit a signal to a remote monitoring station.

16. The hand portable monitoring device of claim 6, further comprising a bypass switch, operative to allow the hand portable monitoring device to be disengaged from its mount without activating the alarm.

17. A hand portable monitoring emergency notification device for alerting emergency response personnel and monitoring personnel presence at a location, the hand portable monitoring emergency notification device comprising:
   a. a hand held casing removably engageable to a mount;
   b. a personnel data system including attendance records generated in response to personnel check in and check out activities
   c. a communications port disposed on the casing and in electrical communication with the personnel data system, when the casing is engaged to the mount, operative to receive personnel presence data from the personnel data system;
   d. a processor and memory internal to the casing and in electrical communication with the communications port, operative to receive and store the personnel presence data received from the personnel data system;
   e. a display disposed on the casing, operative to display the personnel presence data;
   f. a power source internal to the casing, operative to enable functioning of the hand portable monitoring device in the absence of an external power source; and
   g. a quick release mechanism, operative to alert emergency response personnel when the hand portable monitoring device is removed from the mount.

18. A hand portable personnel backup system, the hand portable personnel backup system comprising:
   a. a data collection device, operative to collect personnel presence data representative of the presence of personnel at a location;
   b. a data processing device in electrical communication with the data collection device, the data processing device being operative to receive and store the collected personnel presence data;
   c. a hand portable device in detachable electrical communication with the data processing device, operative to receive and store a backup record of the personnel presence data stored in the data processing device; and
   d. wherein the hand portable device comprises a sender circuit, operative to communicate data to the data processing device.

* * * * *